United States Patent
Gellens et al.

(10) Patent No.: US 7,565,447 B2
(45) Date of Patent: Jul. 21, 2009

(54) EFFICIENT USE OF COMMUNICATION CHANNEL FOR PERIODIC/OCCASIONAL LOWER-PRIORITY AND/OR OPPORTUNISTIC DATA EXCHANGES

(75) Inventors: Randall Coleman Gellens, San Diego, CA (US); Laurence Lundblade, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 968 days.

(21) Appl. No.: 10/727,688

(22) Filed: Dec. 3, 2003

(65) Prior Publication Data

US 2005/0144294 A1 Jun. 30, 2005

(51) Int. Cl.
*G06F 15/173* (2006.01)

(52) U.S. Cl. .............. 709/240; 709/228; 709/232; 709/223

(58) Field of Classification Search ........ 709/231, 709/223–224, 232, 228, 240
See application file for complete search history.

(56) References Cited

U.S. PATENT DOCUMENTS

| 5,793,973 | A | * | 8/1998 | Birdwell et al. | 709/223 |
|---|---|---|---|---|---|
| 5,914,945 | A | * | 6/1999 | Abu-Amara et al. | 370/329 |
| 6,430,161 | B2 | * | 8/2002 | Uemura et al. | 709/232 |
| 6,690,918 | B2 | * | 2/2004 | Evans et al. | 455/41.2 |
| 6,957,269 | B2 | * | 10/2005 | Williams et al. | 709/235 |
| 7,010,578 | B1 | * | 3/2006 | Lewin et al. | 709/217 |
| 7,054,293 | B2 | * | 5/2006 | Tiedemann et al. | 370/335 |
| 7,055,111 | B2 | * | 5/2006 | Scheessele | 709/217 |
| 7,249,176 | B1 | * | 7/2007 | Salas et al. | 709/225 |
| 2002/0040326 | A1 | * | 4/2002 | Spratt | 705/26 |
| 2002/0104011 | A1 | * | 8/2002 | Svoboda et al. | 709/227 |
| 2002/0172212 | A1 | * | 11/2002 | Erving | 370/412 |
| 2003/0023745 | A1 | * | 1/2003 | Noe | 709/224 |
| 2003/0093520 | A1 | * | 5/2003 | Beesley | 709/224 |
| 2005/0108754 | A1 | * | 5/2005 | Carhart et al. | 725/47 |

* cited by examiner

*Primary Examiner*—Philip B Tran
(74) *Attorney, Agent, or Firm*—Abdollah Katbab; Kristine U. Ekwueme

(57) ABSTRACT

A method for transferring data that includes the formulation of a set of criteria that includes a first subset of the criteria and a second subset of the criteria, the first subset of the criteria corresponding to one or more triggering events, the second subset of the criteria corresponding to a group of conditions of a communication link required for a data transfer between a first entity and a second entity, the group consisting of a timing to request data and a timing for the data transfer, a determination that the criteria in the first subset has been met which triggers an evaluation of the criteria in the second subset, a determination that the set of criteria has been met; and the initiation of the data transfer between the first entity and the second entity in response to meeting the set of criteria.

41 Claims, 7 Drawing Sheets

EFFICIENT USE OF COMMUNICATION CHANNEL FOR PERIODIC/OCCASIONAL LOWER-PRIORITY AND/OR OPPORTUNISTIC DATA EXCHANGES

BACKGROUND

1. Field

The present invention relates generally to control of a transfer of data, and more specifically for opportunistic use of a communication link.

2. Background

Consider an entity in which a number of applications are present that can automatically request and/or send information. For example, within the entity, there may reside a computer having software installed that is designed to transfer data over a communication system, such as, for example, PSTN, the Internet, or a local network, and using a wireless system and/or a landline such as with copper and/or fiber optic cable. The software can be placed on the computer to collect information as it becomes available or the software may decide when to request information. When requesting information, such information can be related to an information service, such as, for example, a web browser, a stock quote utility, email and Multimedia Messaging Service (MMS) utilities, an instant messaging (IM) client, networked games, a weather checker, etc. Examples of the types of information that can be received from the information services can be related to an email message status or content, stock quotes, the weather, or the location of another party such as through a cell phone/GPS apparatus. Such information can be considered as low priority in that the requirement for the data transfer is not immediate but may be stored until conditions exist that are more efficient for transfer to the remote device.

Transmission of information service data may be requested on a periodic or ad-hoc basis. Data sessions for such applications can be characterized by one or a combination of small data sizes, very large data sizes, clandestine data transfer, priority of data transfer, etc. If a user brings up a web browser and surfs to, say, the web page of a major news paper, this is considered fairly high priority because the user directly initiated a request for the data and is waiting for it to appear. If a remote user calls the user, again this can be considered high priority because a user directly initiated the call. In both cases, the formation of a communication link can be considered user initiated. The size of this data exchange may be large, while by contrast, if the stock or weather checkers want to see if anything major has changed, this may be a single data exchange of a very small size. Likewise, if the IM client needs to refresh its registration this will typically be a small exchange of one to four round-trips. If an email client checks for new mail, again in most cases this is very small and involves very few round trips. The priority of data exchange performed by this latter group is also low, because in most cases the user has not explicitly asked for nor is waiting on the data. Also, such exchanges can efficiently be done within periodic intervals. For example, a mail client may check for new mail every 20 minutes, an IM client may refresh its registration ever six hours, a weather checker may check with its server every two hours, etc. Thus, applications in this group may require periodic services regarding low-priority data services.

An entity such as a device which has data connectivity via cellular or PCS has several differences from a device that is connected to a typical LAN or other Internet connection. For our purposes, chief among them is that if a communication channel such as the traffic channel is dormant or not established, bringing it up is expensive and time-consuming. Therefore, if each of the periodic low priority applications were to act independently, each could bring up the traffic channel, conduct a very small, brief exchange of data, and then relinquish the traffic channel, which typically would return to dormancy (or some other inactive state) after some period of inactivity. The aggregate effect of a number of such applications would be excessive and wasteful traffic channel usage. Especially when the amount of data to be exchanged is small, the cost of bringing the traffic channel up and down becomes high compared to the amount of data exchanged. By contrast, when a larger amount of data is exchanged, the cost of bringing the traffic channel up and down is spread over more traffic.

There are several potential solutions to this problem. Most commonly, the application and its server can be designed such that instead of the application making periodic checks with its server, the server sends an asynchronous notification to the application when something "interesting" happens. This is attractive because it promises efficient traffic channel use and immediate (or nearly so) notifications. However, there are also several negative consequences, including the need for a common notification mechanism, the lack of such mechanism within the Internet, the need to guard against malicious or excessive notifications, the difficulty in assuring timely delivery of notifications, and the lack of applicability to all cases.

An email or MMS client may receive a large number of notifications if it receives one as each email or MMS message arrives. The email or MMS server, the weather server, the stock quote server, etc. may be operated by different services at different locations and may not have a business relationship with the carrier, and thus may have difficulty sending notifications. The carrier may need to block the ability of outside parties to send notifications to avoid being 'spammed' by an excessive number of legitimate or malicious notifications. Because such notifications are typically sent using common channels, a large amount of them can have a negative impact on the carrier's network. Standard Internet services do not usually include such notification features, and so each would need to be custom developed and deployed.

Finally, notifications do nothing to help in cases where the application needs to renew a registration or otherwise periodically exchange data with a server. Also, if the application responds to the notification by bringing up the traffic channel and exchanging data, the frequency of such notifications may actually cause a higher expense than in polling.

Other potential solutions include co-operation among all applications which need periodic low priority data services. However, this requires special design elements and is not possible in many cases, unless all services are developed by the same source.

Now consider an entity in which a number of applications are present that can automatically send collected information. For example, within the entity, there may reside a computer having software installed that is designed to transfer data over the communication system. The software can be placed on the computer to collect information as it becomes available to store for the later transmission.

Such software can be a cookie. A cookie can be pieces of information generated by a Web server and stored in a user's computer, ready for future access. Cookies are embedded in the HTTP information flowing back and forth between the user's computer and the servers. Cookies were implemented to allow customization of Web information. For example, cookies can be used to personalize Web search engines and to store the user's personal information or the shopping lists of items the user has selected while browsing through a virtual shopping mall.

Essentially, cookies make use of user-specific information transmitted by the Web server onto the user's comptier so that the information might be available for later access by itself or other servers. A user may be aware of the general existence, placement and use of cookies but an application of a particular cookie is usually unnoticed and exactly what information is stored by the cookie may be unknown as well. In many cases, Web servers can subsequently and automatically gain access to relevant cookies whenever the user establishes a connection to them, usually in the form of Web requests.

Marketers and advertisers can use cookies to track personal preferences. They don't know who we are, but they may know our viewing, and, if we buy online, our shopping habits. This information is used to target us with ads they think we would be interested in based on previous buying and visiting habits. Someone whose habits showed an interest in gardening would see different ads than someone whose main interest seemed to be computers, while viewing the same page on the same site.

Another form of cookies called tracking cookies are not exclusive to the site that gives them to you because the site you visit is not actually giving them to you. Ads containing cookies are downloaded from separate servers at the time the web page is requested. So, the cookies you are receiving come from these servers when the ads are loaded, not the site you are visiting.

"DoubleClick" tracking cookies are given at all of their clients' sites, and are reported back to DoubleClick each time someone visits one of those clients. DoubleClick is a global marketer and says on its site that they "deliver 10 billion ads every month. When you visit a site with a DoubleClick cookie, that visit and any information offered, purchases, etc., are recorded. Then, the next minute, day, or a month later, if you visit another DoubleClick site, that information is captured, until eventually, sooner than you think, DoubleClick has a profile on someone's Internet habits, which they use for marketing and advertising purposes.

Cookies can be used by website owners to remember the user's preferences and by advertisers to track the user's online habits. Cookies do not identify the user, but cookies can keep track of the user's movements from page to page on a website. Generally, cookies will not transmit the data they contain unless a corresponding website has been reached by the user, such a website being where the user has provided the information originally.

SUMMARY

A method and apparatus is disclosed for transferring data between a first entity and a second entity. A set of criteria can be formulated that should be met before the data transfer can take place. Included in the set of criteria are one or more events that can trigger initial action by the first entity. The set of criteria can include a number of subsets of the criteria. In one embodiment, a first subset can correspond to the one or more triggering events and where this subset of the criteria should be met before any evaluation of the remaining subsets of the criteria. Criteria of a second subset can correspond to conditions of a communication link such as a timing to send from the first entity and a request for data. Additional subsets of the set of criteria can be created to include such criteria as, for example, the type of data to be transferred, the date or time of day, the amount of data to transfer, etc. Once it is determined at the first entity that the set of criteria has been met, data transfer between the first entity and the second entity can be initiated.

DETAILED DESCRIPTION

Figure 1:
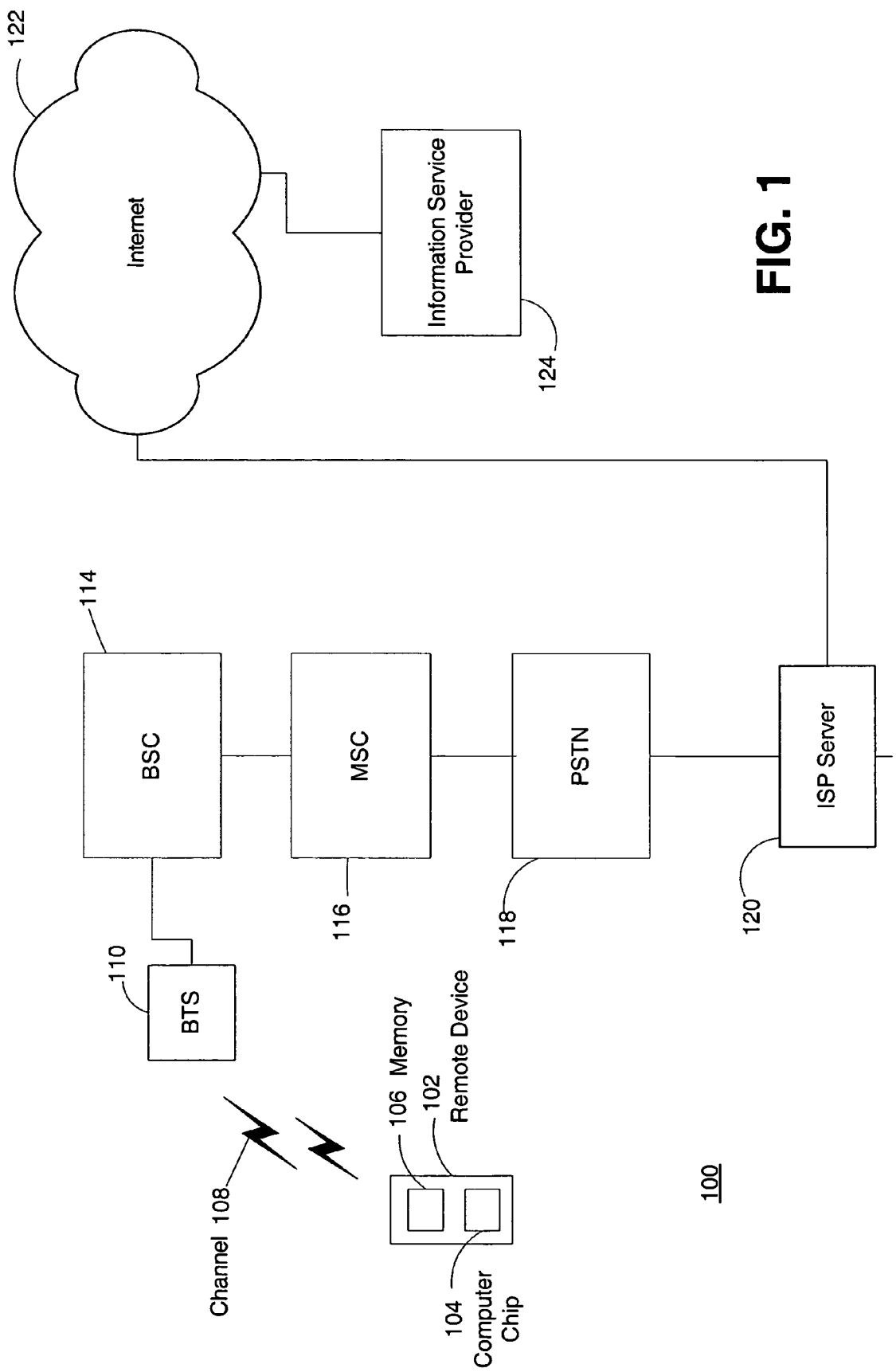
FIG. 1 is illustration of one embodiment of a communication system.

A method and apparatus are disclosed to provide for a first entity, such as a user's device, to transfer information and where such transfer is based upon a set of criteria being met. The information sent by the first entity can be an internally generated request for external information (notification request) or information such as data stored on the user's device, where such information is transferred to a remotely positioned second entity. The set of criteria can be a single set or can include a plurality of subsets of the criteria and where the single set or at least one subset can include one or more criterion that act as a triggering event. The triggering event can be, such as, for example, with a user initiated traffic channel-connection, when an Internet connection is made or when a condition with the connection reaches a quality level. The non-triggering criteria may not be evaluated until the requirements of the triggering criteria/criterion have been met.

More than one application can be placed on the user's device, some of which can be each associated with a type of information and each maintain a set of criteria and where each application can determine when the corresponding set of criteria has been met. Any such application may be capable of receiving, capturing and storing data and/or generating requests for data, e.g., the notification request.

The communication between entities can include, for example, sending a notification request to receive low priority data, for sending data the user is generally but not specifically aware is being transferred or for sending data that has been secretly obtained such as where knowledge of the data collected and transferred is unknown to the user. The term "user", to whom the data collection/transfer is unknown, can refer to a user presently using the device, to a user who purchased the device or to a user whose actions caused the data collecting application to be installed on the device.

The data, such as collected/captured data or an internally generated request for external data (notification request) and the corresponding set of criteria, can be stored on the user's device. Once the triggering criteria, such as, for example in a first subset, have been met, the corresponding application can then determine if the remaining criteria (such as in the remaining subsets) have been met. When the set of criteria have been met, the user's device can then send the stored data or the notification request. The notification request can be for information from an information service or for key generation or registration for a remote device. Along with timing, criteria within any subset can relate to data type and quantity such as relating to advantageous, opportunistic and/or efficient transfer conditions for sending the data or notification request.

Criteria in the set or any subset can include a wide range of options such as, for example, to allow for an optimal time for data transfer such as, for example, for late at night use over the Internet, to restrict a laptop/personal digital assistant (PDA) wireless connection in a crowded room (poor bandwidth), the traffic channel is idle or when an Internet connection has been made or a wireless connection to PSTN has been made, etc. Further, the criteria can define the priority for the information, such as, for example, for GPS monitoring of a person, a lower priority if that person remains in an area and higher priority to alert if that person leaves the area. Another criterion might provide for a stock market alert, such as a changing priority depending on the magnitude of change in one or more selected stock values. The intent here is not to list all possible criteria but to provide a number of possible criteria such that an understanding can be made that the widest possible range of criteria should be available for consideration.

FIG. 1 is an illustration of one embodiment of a communication system for generating, determining to send, and sending a request for notification. Within the communication system 100, such as a wireless communication system, the first entity can be a wireless or remote device 102 such as, for example, a cell phone or a PDA that can contain a computer chip 104. The computer chip 104 can contain on-chip memory and/or the remote device 102 can contain additional chipsets 106 of memory. Further, the memory 106 can be of a type that can be added to the remote device 102 such as with a memory card.

A first application can be installed on the remote device 102, such as an execution environment (EE) or an operating system (OS) to perform coordination activities. One or more additional applications, such as, for example, a second application, a third application, etc. can be installed on the remote device 102 where each additional application can be capable of interacting with a different information service located within a network. Any of the second, third, etc. applications corresponding to information services may require a subscription. A set of criteria can be provided with or for each application.

The remote device 102 can be capable of transmitting on a channel 108, such as, for instance a traffic channel, to a receiving device 110, such as a base station (BTS). A connection to the Public Switched Telephone Network (PSTN) 118 can ultimately be made, such as, for example, from the BTS 110 through a base station controller (BSC) 114 and a mobile switching center (MSC) 116. Through PSTN 118, a connection can be made to a network such as, for example, a local area network (LAN) or the Internet 122.

A server 120 acting as a user's Internet Service Provider (ISP) can be capable of requesting and/or receiving and storing information sent from other locations on the Internet 122, such as from servers associated with the one or more information services 124. The server 120 can be capable of receiving one or more query (notification requests) from the remote device 102, and capable of sending the information from the one or more information services to the wireless device 102 in response to the corresponding one or more notification requests. It should be appreciated that a user's computer or a computer on a local network can act as a server and a gateway to the Internet. Alternately, a remote device 102 can connect to local networks and be independent of the Internet and the present invention can act within this local system. Further, applications on the remote device 102 can be capable of sending a notification request directly to a server of an information system.

In one embodiment, the EE/OS (first application) can include an Application Programming Interface (API) by means of which these information service applications (second application, third application, etc.) register their interest in criteria-based data access such as low periodic priority. In addition to the API, other mechanisms can be available, such as entries within an application description file or structure, etc. This registration can be expected to include information such as, for example, the minimum and maximum intervals at which the application requests data access, as well as supplemental information. Such supplemental information can include whether the application requests additional notifications (such as if the device's IP address changes or if the device becomes unreachable or subsequently reachable), the expected amount or duration of data exchanges, a requested priority for the application's services, etc.

When the set of criteria has been met, such as, for example, a user or a high priority application has initiated a traffic channel (triggering subset of the criteria has been met) and a traffic channel quality exists and/or an application priority is met (second subset of the criteria has been met), the EE/OS can notify the appropriate applications. The applications can be notified, perhaps in round-robin fashion, perhaps in priority order, or using other algorithms (e.g., least-recently used). The EE/OS can notify applications using means that are appropriate to the EE/OS, such as, for example, call-back function, message, event, etc. When notified, the application performs its data exchange and, optionally, the applications can each notify the EE/OS when done. The EE/OS can then notify the next application, etc. This mechanism provides for efficient use of the traffic channel by a number of applications and allows maximum advantage of the low incremental costs of piggy-backing periodic low priority usage on other usage.

Any relationship between the EE/OS and the information system applications is possible. It may be that the triggering subset of the criteria is common to all information system applications and can reside in the EE/OS or alternately, a distinct triggering subset of the criteria can reside in each information system application.

Figure 2:
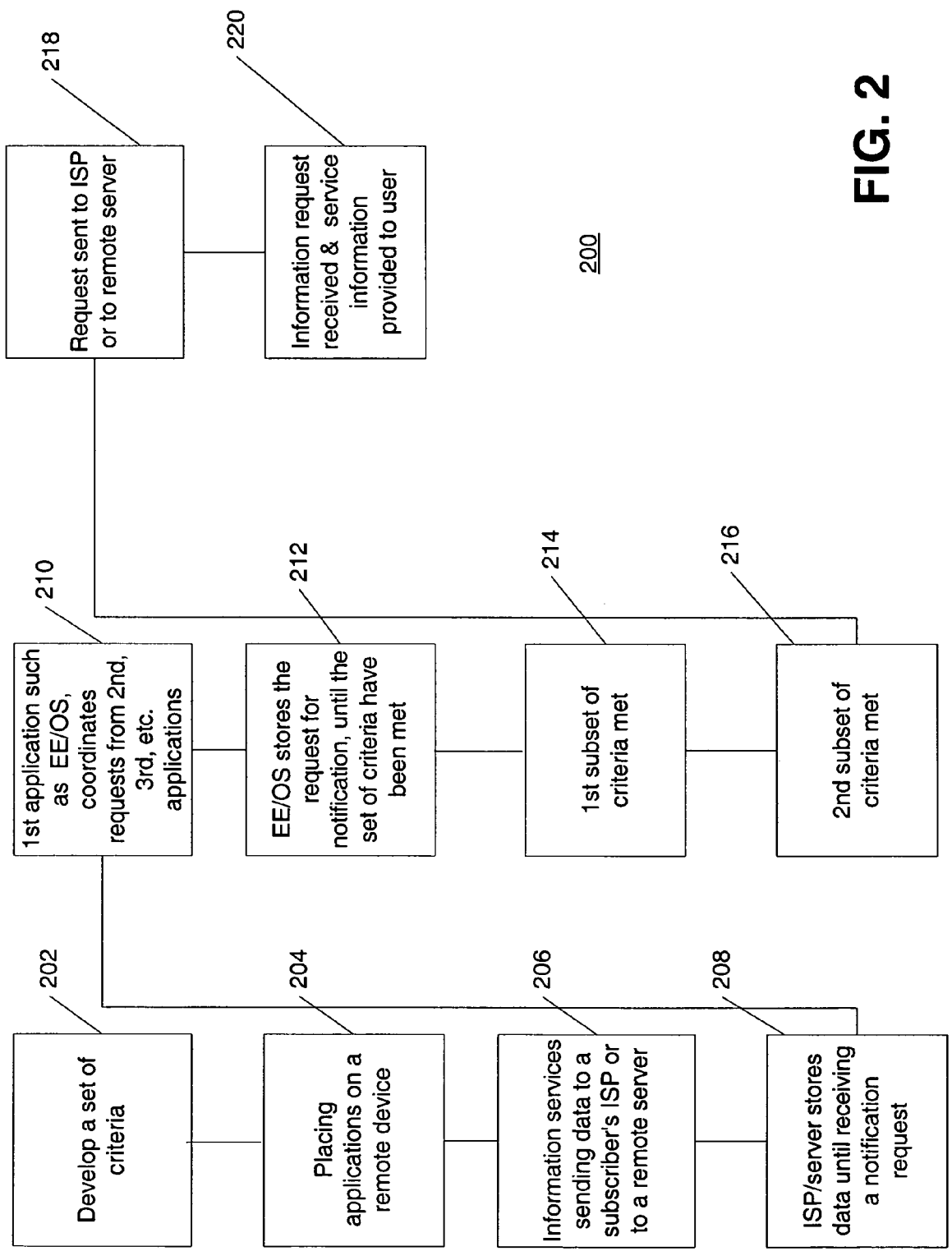
FIG. 2 is a flowchart of one embodiment of a method to generate and store one or more requests for notification for low priority information until a set of criteria has been met.

FIG. 2 is a flowchart of one embodiment of a method to generate and send one or more notification requests for low priority information. The method 200 can generate and store such notification requests at the remote device until the set of criteria are met, such as a communication channel, for example, a traffic channel or a supplemental channel, connection is made.

A first application such as, for example, the EE/OS on the remote device, can internally co-ordinate notification requests using internal data structures and one or more APIs (or other mechanisms), each corresponding to one of the one or more applications associated with information services accessible by the user. Such an environment (EE/OS) can be aware of the state of the traffic channel, any service options which have been negotiated, etc.

As shown in FIG. 2, a set of criteria can be developed that may include one or more subsets of the criteria, where the set of criteria can dictate when a notification request can be sent from the remote device 102. A first subset of the criteria can include one or more criteria corresponding to one or more triggering events, such as, for example, a requirement that a communication link such as a traffic channel connection or supplemental channel connection has been made. A second subset of the criteria can include, such as, for example, one or more criteria corresponding to the timing for generating a notification request, the quality of the communication link, the amount of data being transferred, the priority of the application, etc. Such timing criteria can include, for example, a time of day or a period or frequency of sending. (Operation 202). A first application, such as the EE/OS can be placed onto the remote device. One or more applications, each containing a set of criteria and relating to information services, such as, a second and a third application, can be placed on the remote device (Operation 204). A location, such as, for example, the user's ISP, can periodically receive information from one or more information services. Alternately, once a notification request is received by the remote device, the ISP can request information from the information service (Operation 206). The ISP may store the information so as to be available to the user upon request (Operation 208). The one or more applications on the user's remote device can each be capable of generating a request for the low priority information placed at or available to the user's ISP by the one or more information services. At the remote device, the EE/OS can coordinate all such requests for information (notification requests) generated by these applications, i.e., the second application, the third application, etc. (Operation 210). The EE/OS can coordinate such notification requests until the set of criteria for each application has been met (Operation 212). The first subset of the criteria is met, i.e., the triggering event, such as a communication channel connection (Operation 214). The triggering event can generate a determination that the remaining subset(s) of the criteria have been met, such as a communication channel quality, etc. (Operation 216). The one or more notification request(s) can be sent by the remote device to the user's ISP (Operation 218). The information requested (is either presently stored at the ISP or is sent for by the ISP) is then transferred to the remote device and made available to the user (Operation 220).

In one embodiment, the EE/OS application may coordinate use of a communication channel, such as the traffic or a supplemental channel, among a group of periodic low priority applications. Such coordination can take advantage of occasions when the traffic channel happens to be up and available for other purposes. Such a channel connection can include when the traffic channel is brought up by an incoming/outgoing voice call, a web browser or other application, and where the EE/OS application can alert these periodic low priority applications. In such cases, because the amount of data exchanged is small, the incremental cost of such "piggy-backing" of data transfer can be low.

The EE/OS application can include an API with which these low priority applications register their interest in periodic low-priority data access. In addition to the API, other mechanisms are available, such as entries within an application's description file or structure, etc. Such registration can include information such as the minimum and maximum intervals at which each low priority application requests data access, as well as supplemental information, such as if the low priority application requests additional notifications. Additional notifications can include to see if the user's IP address has changed or if the user's remote device becomes unreachable or subsequently reachable.

When a designated channel is available, the EE/OS application can notify the low priority applications, perhaps in round-robin fashion, perhaps in priority order, or using other algorithms (e.g., least-recently used). The EE/OS application can notify the low priority applications using methods appropriate to the EE/OS application, for example, call-back function, message, event, etc. When notified, each low priority application can perform its data exchange. Optionally, each low priority application can notify the EE/OS application when done and where the EE/OS can then notify the next application, etc. This mechanism provides for efficient use of the designated channel by a number of applications and allows maximum advantage of the low incremental costs of piggy-backing periodic low-priority usage on other usage.

Figure 3:
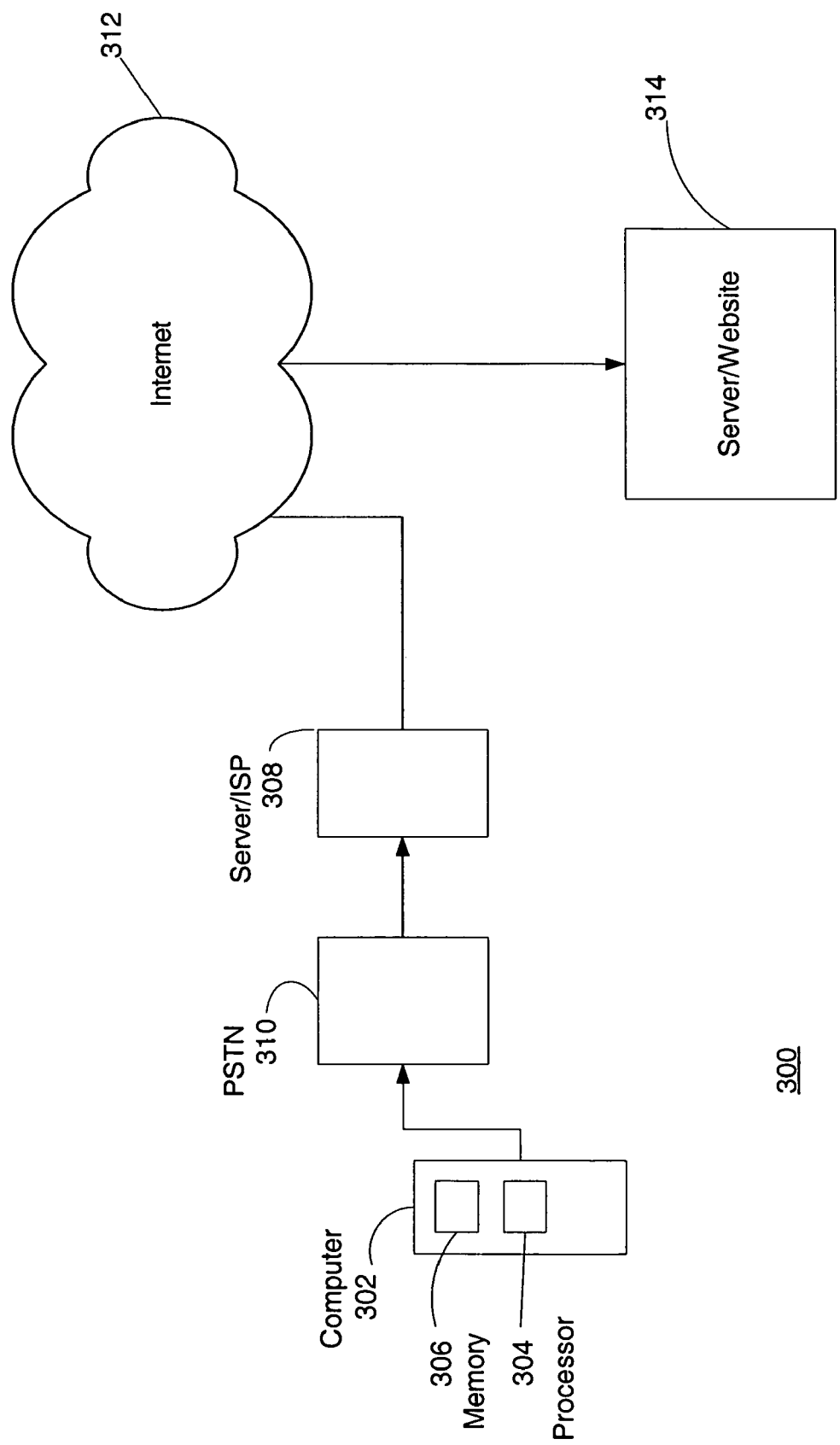
FIG. 3 is an illustration of one embodiment of a computer connected to a network.

FIG. 3 is an illustration of one embodiment of a computer connected to a network. The computer 302 can be a lap top computer, a desk top computer, a PDA, etc. and can include a processor 304 and one or more memory devices 306. The memory devices 306 can include such devices as, for example, RAM memory, a hard disk drive, and a DVD/CD ROM drive. The computer 302 can be connected, such as, for example, via land lines or wireless, to a LAN (not shown) or to a server 308, such as an ISP, through the PSTN 310. Using the ISP 308, access to the Internet 312 as well as a remotely located server/website 314 can be accomplished. The computer 302 can be capable of receiving and/or sending data to the remote server 314.

Figure 4:
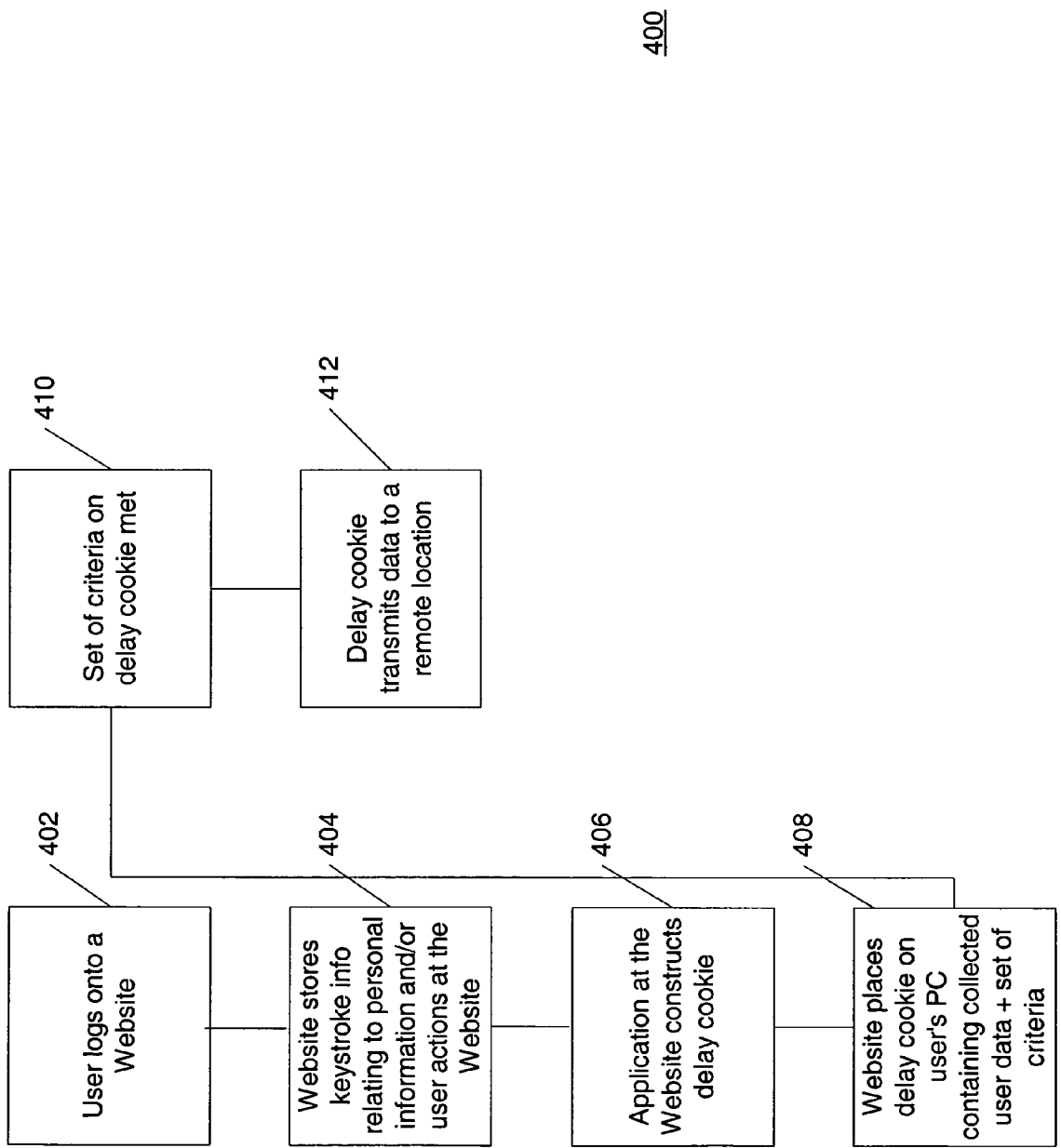
FIG. 4 is a flowchart of one embodiment of a method to store and transfer personal information once a set of criteria has been met.

FIG. 4 is a flowchart of one embodiment of a method to store information for transfer once a set of criteria has been met. Using this method 400, information can be stored in one or more delay cookies on a first entity such as a computer, to be transferred to a remote location under conditions relating to a set of criteria. The user may be unaware of the specific information stored by the delay cookie as well as when and to whom the information may be transferred. A set of criteria can be generated and placed into the program that is the delay cookie. Once a user has logged onto a website, the website can capture and store keystroke information, subtiers of the website visited and information downloaded at that website. At some point prior to the user leaving the website, a delay cookie can be installed on the user's computer by that website that includes some or all of the captured information. Afterward, the delay cookie can transfer the stored information to a remote location which may or may not be the website that originally downloaded the delay cookie. This download may take place without any user action and can occur under conditions related to the set of criteria.

Referring to FIG. 4, a user can direct a computer to access a network such as the Internet and connect to a second entity such as a website hosted by a server (Operation 402). The website may request and store personal information, such as relating to a financial transaction. Alternately, or in addition, the website may store other keystroke actions by the user while at that website, such as, for example, doubleclicks and information about subtier web pages searched, etc. (Operation 404). The website server can construct a delay cookie containing the stored information and a set of criteria (Operation 406). The website server can then download the delay cookie onto the user's computer (Operation 408). The set of criteria can include a single set or the set can include several subsets. A first subset of the criteria can involve one or more criteria that when met can constitute a triggering event. The triggering event can cause the remaining subsets of the criteria to be evaluated. When the set of criteria have been met (Operation 410), the delay cookie can transmit the information stored in the delay cookie to a second entity, such as another computer, etc. at a time other than when the user is connected to the originating website (Operation 412).

In one embodiment, a delay cookie can store the user information but may not wait until the user has re-connected to the corresponding website to transmit the user information contained within. Instead, when connected to a network, such as, for example, the Internet, the delay cookie may send the user information to a different website at a time when the set of criteria has been met.

The triggering event, at the computer with the delay cookie, can include factors such as, for example, a connection/re-connection to the Internet, receipt of an email message, a time of day, etc. The second subset of the criteria can include such factors as, for example, a quality of the Internet connection, a high upload data flow rate to the Internet, other data being uploaded to mask transmission, the amount of data to be sent, the amount of traffic, the time -of day, etc. If subsets are used, any of the above mentioned criteria can be used in the triggering first subset or the remaining subsets of the criteria.

Figure 5:
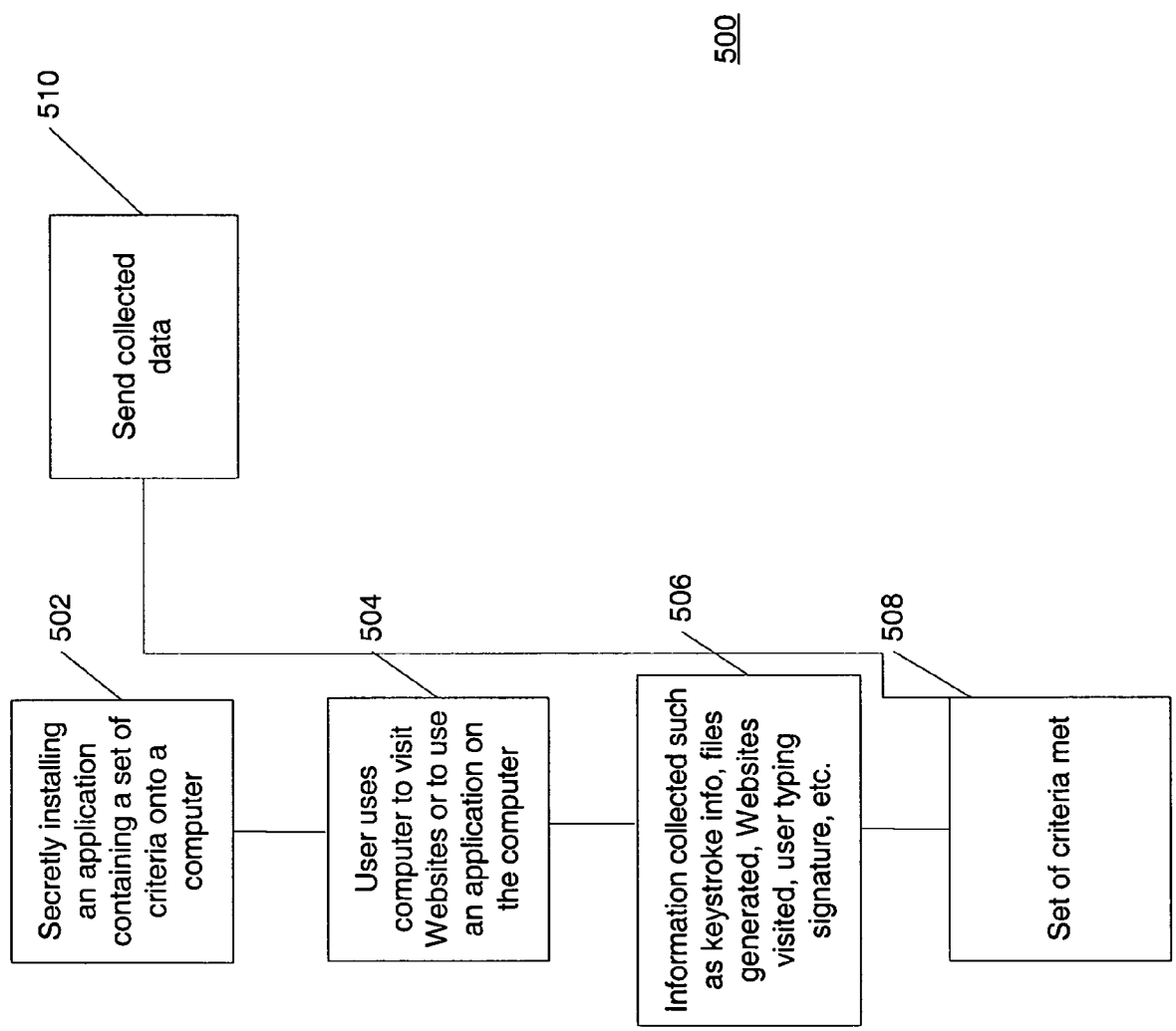
FIG. 5 a flowchart of an embodiment of a method to store and transfer secretly gathered information once a set of criteria has been met.

FIG. 5 is a flowchart of one embodiment of a method to store and transfer secretly gathered information. In this embodiment 500, an application can be placed onto a first entity such as a computer, where the placement is unknown, such as, for example, unknown to the computer purchaser, the present computer owner or the present user. The application can capture information such as, for example, keystroke information, information relating to a typing signature, and website visits. A set of criteria can be in the application that determines conditions for transfer of the captured information to a second entity, such as a remote website. The set of criteria can include a first subset of the criteria that can act as a triggering event. Once the triggering event occurs, a second subset, a third subset, etc. of the criteria can be evaluated. Once the set of criteria has been met, the information can be transferred. Not all the criteria in the other subsets may need to be met; algorithms may be used that allow the criteria in the other subsets to be weighted or prioritized such that some combination of these criteria can be sufficient to allow transfer of the collected information.

The application may be secretly placed on the computer in a variety of ways, such as installed prior to purchase, through an e-mail attachment, by visiting a website, by being connected to the Internet, or secretly bundled with other installed software (Operation 502). The user can use internal commercial applications locally on the computer and to visit various servers and sites and interact with these sites. The commercial applications that are resident on the computer can be such as, for example, a word processor, tax software, a web browser or a spread sheet (Operation 504). Information can be collected regarding user activities, such as, for example, at each of the visited website, information regarding files viewed or generated by the user using the internal applications, keystroke information such as double clicks (or other combinations of key presses and mouse clicks), a user typing signature, etc. (Operation 506). At a time (determined then, predetermined, or not), the collected data, i.e., files generated and/or viewed, any keystroke information, user typing signature, etc., can be transferred under a set criteria, such as, for example, criteria that provide a low "visibility" (to the user) for the transfer or during optimal transfer conditions. The set of criteria that when met determines a transfer of the collected data, can include a first subset of the criteria that when met, can trigger an evaluation of a second or more subsets of the criteria. Such criteria in the first subset (triggering subset) can include, for example, a time of day, a present Internet connection and/or the receipt of an e-mail attachment and/or message. A second subset of the criteria can include a quality of that Internet connection, an amount of data to transfer, the receipt of a signal such as, for example, from a timing algorithm in the secret application, etc. (Operation 508). The data can then be transferred to the second entity, such as a device at a remote location.

The second device can be, for example, a server, a remote computer, wireless cell phone, PDA, etc. (Operation 506 above).

In addition to the above mentioned activities, the information captured by the secret application may relate to any user activities on the computer, such as, for example, any keystroke information, names of files downloaded, use of specific applications, files opened, time duration at a website or running an application, and which is related to each user's typing signature (Operation 408).

The user's typing signature could be determined by using an algorithm to detect a pattern of typing that may be specific to a single user. Such an algorithm may consider any factors that could, individually or collectively, determine the user's identity who typed on the computer, something akin to handwriting analysis. Many factors could be considered, such as, for example, the words chosen, any misspelled words, the typing speed of the typist, the timing of the keystrokes between different specific letters, phrases and grammar used including poor grammar, fonts selected, a pattern of typing errors, software selected, etc.

Figure 6:
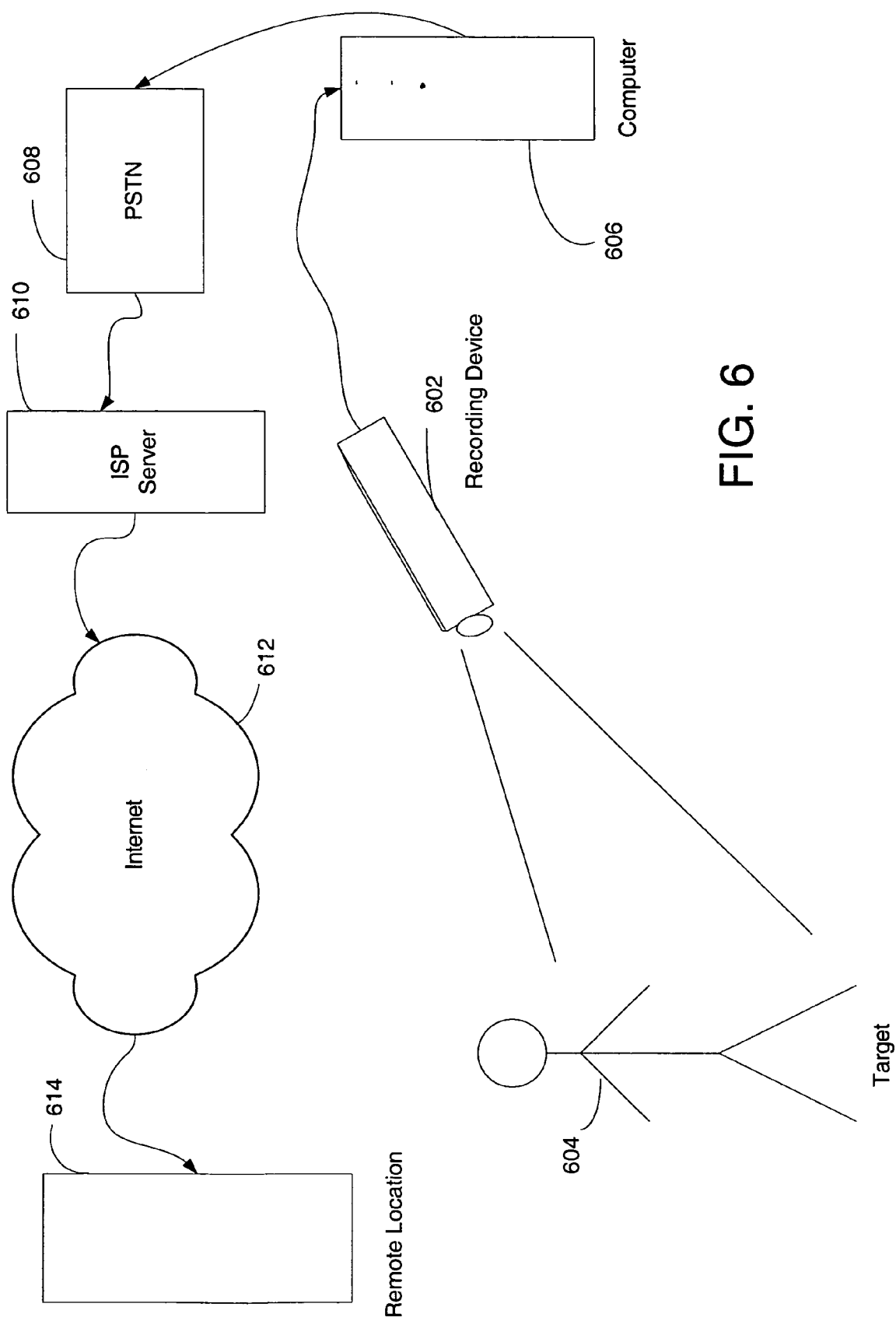
FIG. 6 is an illustration of an alternate embodiment of an apparatus to capture, store and transfer information.

FIG. 6 is an illustration of an alternate embodiment of an apparatus to capture, store and transfer information. The apparatus 602, such as a camera, trained to capture sound/video/photographs of a target 604, such as of a human or a human face. The apparatus 602 can be connected to/embedded within a computer 606 that has an application resident that is capable of storing and transferring the information captured by the camera. A time to transfer the stored information can be determined by a set of criteria residing in an application installed on the computer, and where the information can be transferred across a network. In the embodiment shown, pictures can be transferred across a connection such as PSTN 608, a server 610 providing an ISP, the Internet 612, and finally to be received at a remote apparatus 614 such as another server.

In one embodiment, the camera might be positioned at a location, such as, for example, a city park. During a particular time, such as, for example, late at night, a motion sensor or sound detector connected to the computer might detect sound and/or movement. A response to such movement/sound might be to instruct a video or still camera to take video or one or a series of still photographs at the location of movement/sound. The set of criteria involved in determining when to transfer data to a remote location can include such factors as a frequency and intensity of the sound, a time of day, and specific information regarding the movement, e.g., more than one person involved, etc.

In another embodiment, an application on the computer may be facial recognition software. A camera can be strategically trained at a location, such as, for example, a main door of a bank. When a target, such as, for example, a human and/or a human face, is positioned at the location, the software can capable of comparing the face with other faces in a database. If the software "recognizes" the face, a picture of that face can be taken by the camera. The picture can be transferred as an alert to a remote location after a set of criteria have been met. The set of criteria can include a rating as to the priority or level of threat/interest assigned to the face, i.e., how dangerous is that person? Another level may be determined by how many times a person enters the bank who is not a member, i.e., a potential bank robber. A triggering criterion/criteria may be only that a person is not a member of the bank, or for a specific recognition of a person, a time of day, etc.

Figure 7:
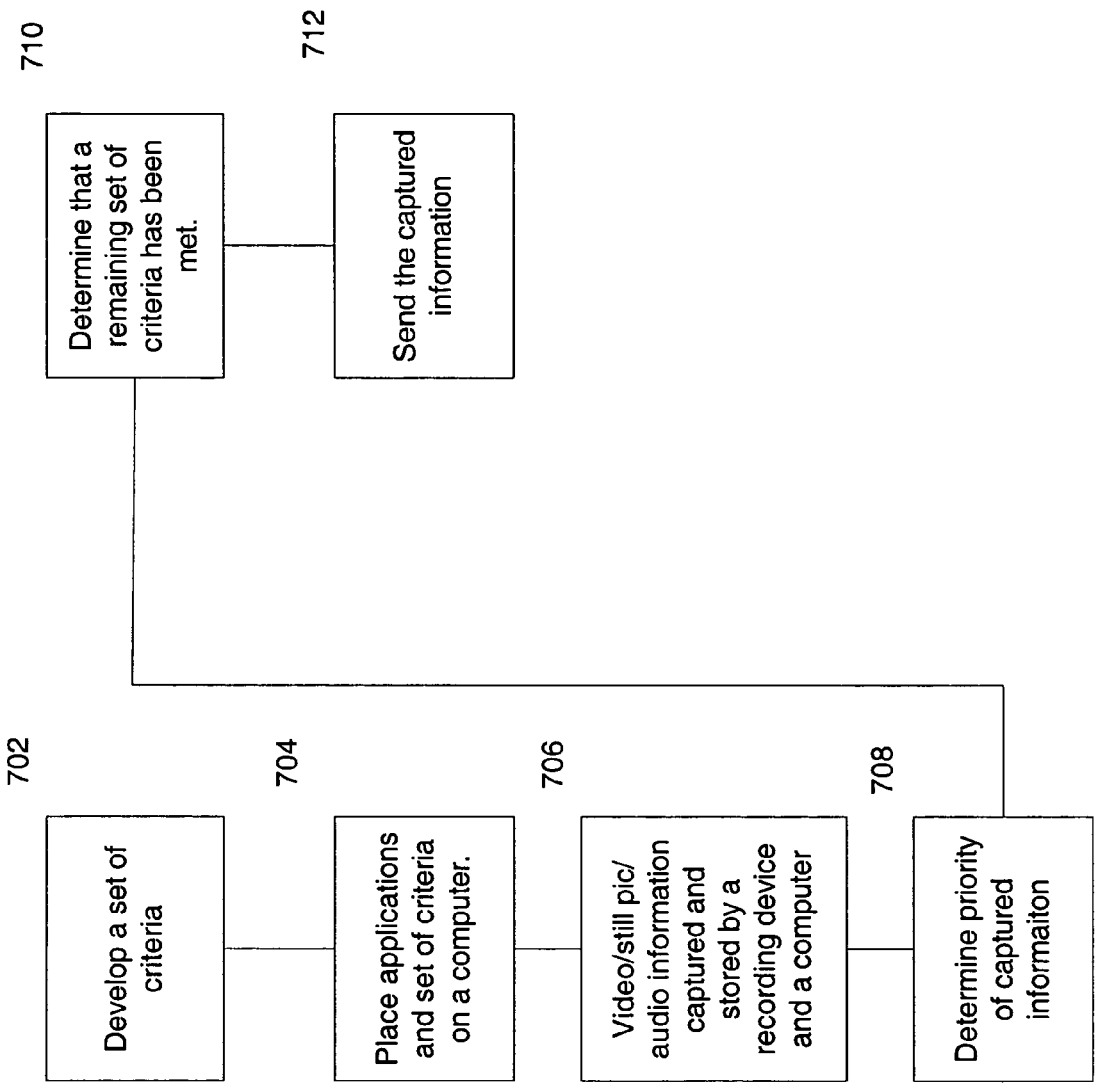
FIG. 7 is a flowchart of an alternate embodiment of a method to capture, store and transfer information when a set of criteria have been met.

FIG. 7 is a flowchart of an alternate embodiment of a method to capture, store and transfer information when a set of criteria have been met. In the one embodiment, a device, such as a sound/video/picture gathering device can be placed at a public location, such as, for example, a sports stadium, an airport, an entry point at the U.S. border, a court house, etc. The device can be of any form, such as, for example, a cellular phone capable of taking a picture (picturephone), a security camera, a hand-held video camera, a hand-held audio recording device, etc. The device can be connected to a computer having one or more applications installed where at least one application can have a set of criteria to determine conditions for information transfer from the computer.

A set of criteria can be constructed to determine when to send data (operation 702). One or more applications, with at least one having the set of criteria, can be placed on a computer to make a determination of priority regarding each video clip, picture, and/or sound bite (operation 704). The data, which can be, for example, video, still pictures and/or sound, can be taken: such as, for example, of people, and stored at the computer (operation 706). A high enough priority can act as a triggering criterion in a set of criteria, such priority can include a determination as to, for example, urgency, safety/threat level, a protection of property, etc. (operation 708). The computer can make a determination to send the captured information when remaining factors in the set of criteria have been met, where such remaining criteria can include, for example, a time of day, a quality of the connection, a size of the data to send, etc. (operation 710). The data is sent to a remote site, such as over a local wireless network, or over a network such as PSTN and the Internet, and were the receiving site can be a server, or another computer connected to the Internet (operation 712).

Not all of the criteria in "the set of criteria" may need to be met to allow information transfer. It may be determined that the set of criteria have been met with only a partial fulfillment of the set of criteria. In one embodiment, algorithms can be used that allow predetermined values relating to the criteria to be weighted or prioritized such that only a partial combination of these criteria can be sufficient to allow transfer of the collected information or perhaps only some of the collected data.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a transmitter, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. In one embodiment, a storage medium is coupled to the processor such that the processor can read information from, and write information to, the storage medium. In the alternative, the storage medium may be integral to the processor. The processor and the storage medium may reside in an ASIC. The ASIC may reside in a user's device and in the alternative, the processor and the storage medium may reside as discrete components in the user's device.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for transferring data, comprising:
  receiving one or more registrations in a first entity, wherein each registration comprises a set of criteria for transferring data, the set of criteria comprising at least one triggering event;
  recognizing a communication link between the first entity and a second entity;
  identifying, based on an occurrence of at least one of the at least one triggering event, registrations in the first entity associated with the set of criteria that has been met;
  assigning priority indicators to the identified registrations in the first entity; and
  initiating a transfer over the communication link between the first entity and the second entity to transfer data associated with the identified registrations based on the priority indicators.

2. The method of claim 1, wherein the set of criteria identifies at least one of an amount of data to be transferred, a type of data to be transferred, a type of communication link, the amount of data currently being sent over the communication link, an available data transfer rate, power consumption associated with transmitting the data, an amount of data packet re-transmissions per unit time, a battery power level, a user activity level, and a time of day indicator.

3. The method of claim 1, further comprising performing at least one of said receiving, recognizing, identifying, assigning, and initiating in a background mode.

4. The method of claim 1, further comprising performing the method on a device chosen from a group of devices comprising a personal laptop computer, a personal standup computer, a wireless communication device, a still camera, a video camera, an audio recording device and a PDA.

5. The method of claim 1, wherein the data represents at least one of keystroke information, files viewed, files created, websites visited, and software application usage.

6. The method of claim 1, wherein the one or more registrations identify at least one of opportunistic data transfers and periodic data transfers.

7. The method of claim 1, wherein said recognizing comprises establishing the communication link if the communication link is not recognized within a selected time interval.

8. The method of claim 1, wherein the communication link is at least one of a traffic channel and a supplemental channel.

9. The method of claim 1, wherein the data comprises at least one of a notification request and a data exchange associated with at least one of an email program, a stock quote utility, an MMS utility, an instant messaging client, networked games, a weather checker, a person locator, a location monitor, a news checker, and a medical reminder.

10. The method of claim 1, further comprising performing at least one of said receiving, recognizing, identifying, assigning, and initiating such that the activities are unknown to a user of the first entity.

11. An apparatus for transferring data, comprising:
a processor and a memory;
means for receiving one or more registrations, wherein each registration comprises a set of criteria for transferring data, the set of criteria comprising at least one triggering event;
means for recognizing a communication link;
means for identifying, based on an occurrence of at least one of the at least one triggering event, registrations associated with the set of criteria that has been met;
means for assigning priority indicators to the identified registrations; and
means for initiating a transfer over the communication link to transfer data associated with the identified registrations based on the priority indicators.

12. The apparatus of claim 11, wherein the set of criteria identifies at least one of an amount of data to be transferred, a type of data to be transferred, a type of communication link, the amount of data currently being sent over the communication link, an available data transfer rate, power consumption associated with transmitting the data, an amount of data packet re-transmissions per unit time, a battery power level, a user activity level, and a time of day indicator.

13. The apparatus of claim 11, further comprising means for performing at least one of said receiving, recognizing, identifying, assigning, and initiating in a background mode.

14. The apparatus of claim 11, wherein the apparatus is configured to operate on a device chosen from a group of devices comprising a personal laptop computer, a personal standup computer, a wireless communication device, a still camera, a video camera, an audio recording device and a PDA.

15. The apparatus of claim 11, wherein the data represents at least one of keystroke information, files viewed, files created, websites visited, and software application usage.

16. The apparatus of claim 11, wherein the one or more registrations identify at least one of opportunistic data transfers and periodic data transfers.

17. The apparatus of claim 11, wherein said means for recognizing comprises means for establishing the communication link if the communication link is not recognized within a selected time interval.

18. The apparatus of claim 11, wherein the communication link is at least one of a traffic channel and a supplemental channel.

19. The apparatus of claim 11, wherein the data comprises at least one of a notification request and a data exchange associated with at least one of an email program, a stock quote utility, an MMS utility, an instant messaging client, networked games, a weather checker, a person locator, a location monitor, a news checker, and a medical reminder.

20. The apparatus of claim 11, further comprising means for performing at least one of said receiving, recognizing, identifying, assigning, and initiating such that the activities are unknown to a user.

21. An apparatus for transferring data, comprising:
a processor configured to receive one or more registrations, wherein each registration comprises a set of criteria for transferring data, the set of criteria comprising at least one triggering event, recognize a communication link, identify, based on an occurrence of at least one of the at least one triggering event, registrations associated with the set of criteria that has been met, and assign priority indicators to the identified registrations; and
a transmitter configured to initiate a transfer over the communication link to transfer data associated with the identified registrations based on the priority indicators.

22. The apparatus of claim 21, wherein the set of criteria identifies at least one of an amount of data to be transferred, a type of data to be transferred, a type of communication link, the amount of data currently being sent over the communication link, an available data transfer rate, power consumption associated with transmitting the data, an amount of data packet re-transmissions per unit time, a battery power level, a user activity level, and a time of day indicator.

23. The apparatus of claim 21, wherein said processor is configured to perform at least one of said receiving, recognizing, identifying, assigning, and initiating in a background mode.

24. The apparatus of claim 21, wherein said apparatus is configured to operate on a device chosen from a group of devices comprising a personal laptop computer, a personal standup computer, a wireless communication device, a still camera, a video camera, an audio recording device and a PDA.

25. The apparatus of claim 21, wherein the data represents at least one of keystroke information, files viewed, files created, websites visited, and software application usage.

26. The apparatus of claim 21, wherein the one or more registrations identify at least one of opportunistic data transfers and periodic data transfers.

27. The apparatus of claim 21, wherein said processor is configured to establish the communication link if the communication link is not recognized within a selected time interval.

28. The apparatus of claim 21, wherein the communication link is at least one of a traffic channel and a supplemental channel.

29. The apparatus of claim 21, wherein the data comprises at least one of a notification request and a data exchange associated with at least one of an email program, a stock quote utility, an MMS utility, an instant messaging client, networked games, a weather checker, a person locator, a location monitor, a news checker, and a medical reminder.

30. The apparatus of claim 21, wherein said processor is configured to perform at least one of said receiving, recognizing, identifying, assigning, and initiating such that the activities are unknown to a user.

31. A computer readable storage media embodying a program, which when executed by a processor, operates to perform a method to transfer data, the method comprising:

receiving one or more registrations in a first entity, wherein each registration comprises a set of criteria for transferring data, the set of criteria comprising at least one triggering event;

recognizing a communication link between the first entity and a second entity;

identifying, based on an occurrence of at least one of the at least one triggering event, registrations in the first entity associated with the set of criteria that has been met;

assigning priority indicators to the identified registrations in the first entity; and initiating a transfer over the communication link between the first entity and the second entity to transfer data associated with the identified registrations based on the priority indicators.

32. The computer readable storage media embodying a program of claim 31, wherein the set of criteria identifies at least one of an amount of data to be transferred, a type of data to be transferred, a type of communication link, the amount of data currently being sent over the communication link, an available data transfer rate, power consumption associated with transmitting the data, an amount of data packet re-transmissions per unit time, a battery power level, a user activity level, and a time of day indicator.

33. The computer readable storage media embodying a program of claim 31, further comprising performing at least one of said receiving, recognizing, identifying, assigning, and initiating in the background mode.

34. The computer readable storage media embodying a program of claim 31, further comprising performing the method on a device chosen from a group of devices comprising a personal laptop computer, a personal standup computer, a wireless communication device, a still camera, a video camera, an audio recording device and a PDA.

35. The computer readable storage media embodying a program of claim 31, wherein the data represents at least one of keystroke information, files viewed, files created, websites visited, and software application usage.

36. The computer readable storage media embodying a program of claim 31, wherein the one or more registrations identify at least one of opportunistic data transfers and periodic data transfers.

37. The computer readable storage media embodying a program of claim 31, wherein said recognizing comprises establishing the communication link if the communication link is not recognized within a selected time interval.

38. The computer readable storage media embodying a program of claim 31, wherein the communication link is at least one of a traffic channel and a supplemental channel.

39. The computer readable storage media embodying a program of claim 31, wherein the data comprises at least one of a notification request and a data exchange associated with at least one of an email program, a stock quote utility, an MMS utility, an instant messaging client, networked games, a weather checker, a person locator, a location monitor, a news checker, and a medical reminder.

40. The computer readable storage media embodying a program of claim 31, further comprising performing at least one of said receiving, recognizing, identifying, assigning, and initiating such that the activities are unknown to a user.

41. A computer program embedded in a computer readable storage medium, when executed by a processor for transferring data, the computer program comprising:

a first module for receiving one or more registrations in a first entity, wherein each registration comprises a set of criteria for transferring data, the set of criteria comprising at least one triggering event;

a second module for recognizing a communication link between the first entity and a second entity;

a third module for identifying, based on an occurrence of at least one of the at least one triggering event, registrations in the first entity associated with the set of criteria that has been met;

a fourth module for assigning priority indicators to the identified registrations in the first entity; and a fifth module for initiating a transfer over the communication link between the first entity and the second entity to transfer data associated with the identified registrations based on the priority indicators.

* * * * *